United States Patent [19]

Bottrell et al.

[11] Patent Number: 4,772,977
[45] Date of Patent: Sep. 20, 1988

[54] SYSTEM FOR PROTECTION OF ELECTRICAL MACHINES AGAINST DAMAGE FROM RESIDUAL VOLTAGE EFFECTS

[75] Inventors: Gerald W. Bottrell, La Crescenta; Luke Y. Yu, San Marino, both of Calif.

[73] Assignee: FTS, Inc., Downey, Calif.

[21] Appl. No.: 44,721

[22] Filed: May 1, 1987

Related U.S. Application Data

[63] Continuation-in-part of Ser. No. 790,151, Oct. 23, 1985, Pat. No. 4,710,841.

[51] Int. Cl.$^4$ .............................................. H02H 7/08
[52] U.S. Cl. ......................................... 361/23; 361/29; 361/33; 207/86; 207/142
[58] Field of Search ................. 361/23, 29, 33, 92, 361/56, 57, 87, 93; 307/64, 70, 85, 86, 142

[56] References Cited

U.S. PATENT DOCUMENTS

| | | | |
|---|---|---|---|
| 4,271,446 | 6/1981 | Comstock | 361/56 |
| 4,710,841 | 12/1987 | Bottrell | 361/23 |

FOREIGN PATENT DOCUMENTS 884024 11/1981 U.S.S.R. ............................. 361/92

Primary Examiner—G. P. Tolin
Assistant Examiner—Derek S. Jennings
Attorney, Agent, or Firm—John J. Posta, Jr.

[57] ABSTRACT

A system for use with electrical machines allows fast transfers to be made from one power source to another or fast reconnections to be made to a momentarily interrupted power source without subjecting the machines to unsafe voltage levels. The system short circuits the electrical machines to bring their residual voltage down quickly to a level at which the machines may be safely connected to a power source, and works with both induction and synchronous machines. No interlocking devices are necessary to the system, thus further speeding up fast transfer while minimizing the effects of inadvertent direct short circuiting of the power source.

32 Claims, 4 Drawing Sheets

SYSTEM FOR PROTECTION OF ELECTRICAL MACHINES AGAINST DAMAGE FROM RESIDUAL VOLTAGE EFFECTS

This application is a continuation-in-part of Ser. No. 790,151, filed on Oct. 23, 1985 now U.S. Pat. No. 4,710,841 issued Dec. 1, 1987.

BACKGROUND OF THE INVENTION

Field of the Invention

The present invention relates generally to a system for protecting electrical machines from damage caused by residual voltage effects following a momentary interruption in the electrical power supply, and more particularly to a system for allowing quick reconnection to a power supply after dissipating the residual voltage in the machine by short circuiting the stator windings.

When the electrical power supply to an electrical machine is interrupted, a residual voltage which decays exponentially with time will be produced within the machine. Induction motors and generators produce such a voltage at their terminals, and synchronous motors and generators operate as induction machines following interruption of current in the DC field windings. Synchronous machines, of course, have somewhat longer open circuit and short circuit time constants.

The initial residual voltage magnitude in an induction machine (or in a synchronous machine with its DC field interrupted) may be nearly equal to the magnitude of the source voltage. The residual voltage decays exponentially to approximately thirty-seven percent of its initial value in a period of time which is equal to the machine's open circuit time constant. The open circuit time constant may vary from approximately one-half second for smaller machines to three or four seconds for fairly large machines, or even longer in the case of large synchronous machines.

If the power supply to an electrical machine is interrupted and quickly re-established, the machine may be subjected to a voltage equal to its residual voltage added vectorially to the voltage of the re-established oncoming power supply. If the resulting voltage across the machine is greater than approximately 125 to 130 percent of the rated voltage of the machine, the resulting high current and torque may result in significant damage occurring to the machine.

It will be recognized that it is highly desirable to resume operation as soon as possible; indeed, fast transfer of medium voltage auxiliaries is a standard feature of most major U.S. power plants. However, due to residual voltage, particularly in larger electrical machines, rapid reclosing of the utility switch to restore system power and operation is seldom a possibility. Following a tripping occurrence such as a self-clearing short circuit in a plant with large electrical machines, it is not possible to quickly re-establish power to the plant even though the condition which caused the interruption is no longer present.

Similarly, if large electrical machines are in use on the line it is not possible to rapidly switch from an interrupted or failed primary source of power to a secondary source of power due to the presence of residual voltages which effectively prevent such a rapid transfer. It is apparent that in either the case of a momentary interruption in the power source due to a self-clearing fault or in the case of a transfer to an auxiliary power source, large machines on the line will effectively cause a line shutdown, which is a very unwelcome consequence potentially occurring relatively frequently.

In the past three switching techniques have been utilized to avoid machine damage: conventional fast transfer, in-phase transfer, and delayed transfer. The first technique, conventional fast transfer, is possible only under the condition that it is possible to switch from one source to another so fast that residual voltage of the machine will not drift too far out of phase with the auxiliary voltage source. Fast transfer systems are used extensively in power plants for transfer of the medium voltage auxiliary bus from the normal source to a standby or emergency source without affecting plant operations.

In order for fast transfer to be safely used, it is necessary for several conditions to be met. First, the machines and accompanying mechanical equipment must always be in operation and have high and fully predictable inertia, generally an inertia constant H which is greater than two (2.0). Secondly, the two sources must always be in synchronism, having almost exactly the same phase angle. An additional limitation is imposed on the switchgear, which must be of the high speed stored energy type to function properly in making the fast transfer. It is also important to realize that fast transfer is only initiated in the event of a supply transformer failure.

Other types of source interruptions, which occur more frequently than supply transformer failures, are likely to introduce uncertainties as to the transfer time or the rate of machine deceleration. These conditions and restrictions relegate conventional fast transfer switching to a relatively insignificant role. Attempts to utilize a fast transfer system in applications beyond the narrow range defined above incur significant risk to both the electrical machines and the driven equipment.

The second switching technique utilized in the past is in-phase transfer, which is substantially similar to conventional fast transfer. In-phase transfer differs from fast transfer in that it utilizes a bus transfer relay to switch to an alternate voltage source at precisely the right moment, thereby assuring that the phase angles of the residual machine voltage and the oncoming line voltage are identical or within acceptable limits. The simplest form of such a bus transfer relay is a phase angle relay, but in such a system safety is dependent on constant bus loading, constant machine loading, and the presence of both large and predictable load inertias, conditions which are usually not attainable in practice.

A more sophisticated but complex transfer relay system will adjust its performance to match existing loading conditions. While this is more practical in that it allows for variable loading of the bus and machines, it has one significant disadvantage in that it requires additional time for detection of loading conditions. The additional delay restricts such a system to high inertia systems with a slip at transfer generally not exceeding 8.3 percent. Only machines having an effective inertia constant H in the range of one (1.0) to two (2.0) or greater will meet this requirement and allow the use of such a system.

The third technique of switching, and the most popular technique to date, is delayed transfer, which utilizes a timer or a residual voltage relay to delay switching to an alternate voltage source until motor residual voltage has safely decayed to 25 or 30 percent of machine rated voltage. While delayed transfer is essentially risk free, transfer is so slow that it inevitably interrupts process operations. In addition, motors generally can not be re-accelerated simultaneously following a slow transfer in which motor speeds have fallen so low that inrush currents approach motor locked rotor values.

In such a case stalling would occur due to depressed voltage. Because of this inevitable consequence, delayed transfer systems typically provide for re-accelerating only those drives necessary for an orderly shutdown. Drives are sometimes then restarted in orderly groups, and full plant operations are usually restored in from one to five minutes. Such shutdowns are generally costly, and all too frequently result in costly process upsets.

It is therefore apparent that the three known switching techniques are not at all satisfactory in most cases. It is desirable to have an alternative switching technique which overcomes the disadvantages inherent in conventional fast transfer, in-phase transfer, and delayed transfer. Such a system would allow for fast switching without the disadvantages presented by the techniques described above.

SUMMARY OF THE INVENTION

The disadvantages and limitations of the background art discussed above are overcome by the present invention. With this invention, fast transfers from one power source to another or fast reconnections to a momentarily interrupted power source are possible without subjecting the machines to unsafe voltages resulting from machine residual voltage added vectorially to the voltage of the oncoming power supply. The present invention utilizes a fast transfer switch to short circuit the electrical machines after the source voltage has been interrupted, causing the residual voltage to decay rapidly. Following the decay of the residual voltage below a predetermined value, the short circuit is removed and the source voltage is re-established.

Immediately following an interruption in the power supply, the fast transfer switch closes to allow residual voltage to decay much faster that it otherwise would. In this respect, the present invention differs from conventional delayed transfer systems in that it causes residual voltage to decay to a value allowing safe re-establishment of the power supply in less than five (5) percent of the time required by delayed transfer systems. Such a short delay of course greatly improves the ability of the electrical machines to reaccelerate following a bus transfer. Stalling due to depressed voltage will be minimized or completely prevented by the system of the present invention.

In the preferred embodiment, short circuiting of the machines is accomplished with fused contactors, although as detailed in alternative embodiments low voltage circuit breakers with direct-acting trip devices or low or medium voltage circuit breakers with instantaneous overcurrent relay tripping could be used instead. The machines are short circuited either for a predetermined period of time, or until the residual voltage drops below a predetermined value. The short circuit is then removed, and the power supply may then be reestablished or an alternate power supply may be connected.

The invention of this continuation-in-part application functions much as does the circuit shown in the parent application, with one significant difference. The various interlocking devices required by the parent application are not necessary in the present invention since the effects of inadvertently short circuiting a power supply are minimized by the addition of fuses, or one of the alternate embodiments performing the function of fuses. By so modifying the switching arrangement, two important advantages are achieved. First, the time required to perform the required switching operations is further reduced, making the system more efficient and more likely to allow even low inertia machines a successful ride through. Secondly, since the interlocking equipment is eliminated, and only fuses are added, the overall cost of the system is substantially reduced.

The system of the present invention affords many significant advantages in that it allows fast transfers from one power source to another or fast reconnections to a momentarily interrupted power source without subjecting the machines to unsafe voltage levels. It allows successful transfers of low inertia systems and rapid reclosure of utility lines not allowed by previous switching systems, and does not require that the machine be in synchronism with the line, or even that the phase angle be nearly the same.

With the present invention even a synchronous machine may be fast transferred, by first interrupting its field. This was seldom possible with previous approaches to line transfers. Fast transfers following upstream disturbances are also possible, even though such disturbances may produce uncertainties in transfer time or motor deceleration. Finally, the system of the present invention is quicker and cheaper than the system of the parent application referenced above, making it a highly desirable system for use with electrical machines.

DESCRIPTION OF THE DRAWINGS

These and other advantages of the present invention are best understood with reference to the drawings, in which.

DETAILED DESCRIPTION OF THE PREFERRED EMBODIMENT

The preferred embodiment of the invention is described in examples primarily with reference to use with induction motors. It should be noted, however, that the present invention is equally applicable to motors and generators, and to synchronous machines as well as to induction machines. It will be apparent to those skilled in the art that such other electrical machines will also benefit from the present invention as described below.

Figure 1:
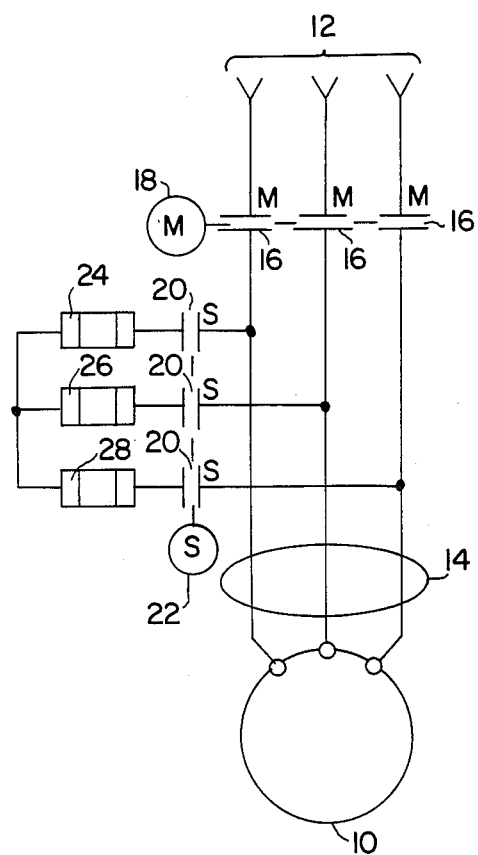
FIG. 1 is a schematic diagram of a power circuit for allowing quick reconnection to a power supply following a brief interruption without damaging the electrical machine connected to the power supply.

In FIG. 1, a three phase electrical machine 10 is shown connected to a voltage source 12 by three supply conductors 14 and source switching means 16. In the embodiment shown in FIG. 1, the source switching means 16 is a three pole electrically-held contactor which has three sets of contacts and which is controlled by a contactor coil 18. The three supply conductors 14 are connected to one side of a short circuiting switch 20, which in FIG. 1 is shown to be a three pole electrically-held contactor with three sets of contacts. The short circuiting switch 20 is controlled by a short circuiting coil 22.

The other side of each contact of the short circuiting switch 20 is connected to one side of each of three fuses 24, 26, and 28, and the other side of the fuses 24, 26, and 28 are connected together to complete the short circuit. The fuses 24, 26, and 28 may be current-limiting or other types of fuses. It should be noted that the fuses 24, 26, and 28 may be placed on either the live side or the short circuit side of the short circuiting switch 20. If the fuses 24, 26, and 28 were placed on the live side of the short circuiting switch 20, the contacts on the short side of the short circuiting switch 20 would be connected together to complete the short circuit. This fuse placement is equally applicable to the other embodiments of the present invention shown in other figures.

It is important to consider that there need be no interlocking devices installed and operating on the source switching means 16 and the short circuiting switch 20. Should both the source switching means 16 and the short circuiting switch 20 be inadvertently closed at the same time, the fuses 24, 26, and 28 would burn out immediately, minimizing the effects on the voltage source 12 and system performance.

A brief description of the operation of the system shown in FIG. 1 is in order. In normal operation, the source switching means 16 is closed, operating the electrical machine 10 from the voltage source 12, and the short circuiting switch 20 is open. Following a momentary interruption in the voltage source 12, the source switching means 16 would be opened by the source switching coil 18, and the short circuit switch 20 would be closed by the short circuiting coil 22.

The residual voltage of the electrical machine 10 is then discharged through the short circuit, and will drop to 25 to 30 percent of the rated motor voltage in well less than one-half of a second, even for the largest electrical machines. At this point, the short circuiting switch 20 may be opened by the short circuiting coil 22, and then the source switching means 16 may be closed by the source switching coil 18 to reestablish the voltage source 12 to the electrical machine 10, assuming that the voltage source 12 has passed the momentary interruption. Since the residual voltage of the electrical machine 10 is down to below the 25 to 30 percent of rated voltage level, even if the voltage source 12 is completely out of synchronism with the electrical machine 10, or the phase angle is greatly different in the voltage source 12 as compared to that of the electrical machine 10, closing the source switching means 16 will not damage the electrical machine 10.

The short circuiting switch 20 may be held closed for either a predetermined time, which time is sufficient for the system to discharge the residual voltage down to a safe level, or until the residual voltage level drops below a preselected level, whichever is desired. Technology to monitor the residual voltage level is well known in the art. By discharging the residual voltage through the short circuit, the time required for the residual voltage to drop to 25 or 30 percent of rated voltage is reduced by a factor of approximately 20 over the time required with no short circuit.

The time required for transfer back onto line is further reduced by the absence of interlocking equipment. In fact, it has been determined that the source switching coil 18 and the short circuiting switch coil 22 may be energized simultaneously, since typically the source switching means opens before the short circuiting switch has time to close. This time saving operation will enable low inertia machines which would not ordinarily ride the disruption out to successfully ride it through.

Although the description of FIG. 1 contemplates induction machines, it is important to note that synchronous machines may also be switched using the principles of the present invention. The additional step of interrupting the DC field of synchronous machines is necessary before short circuiting them, since synchronous machines with their DC field interrupted act like induction machines. One additional difference to note is that synchronous machines generally have longer time constants than induction machines.

Figure 2:
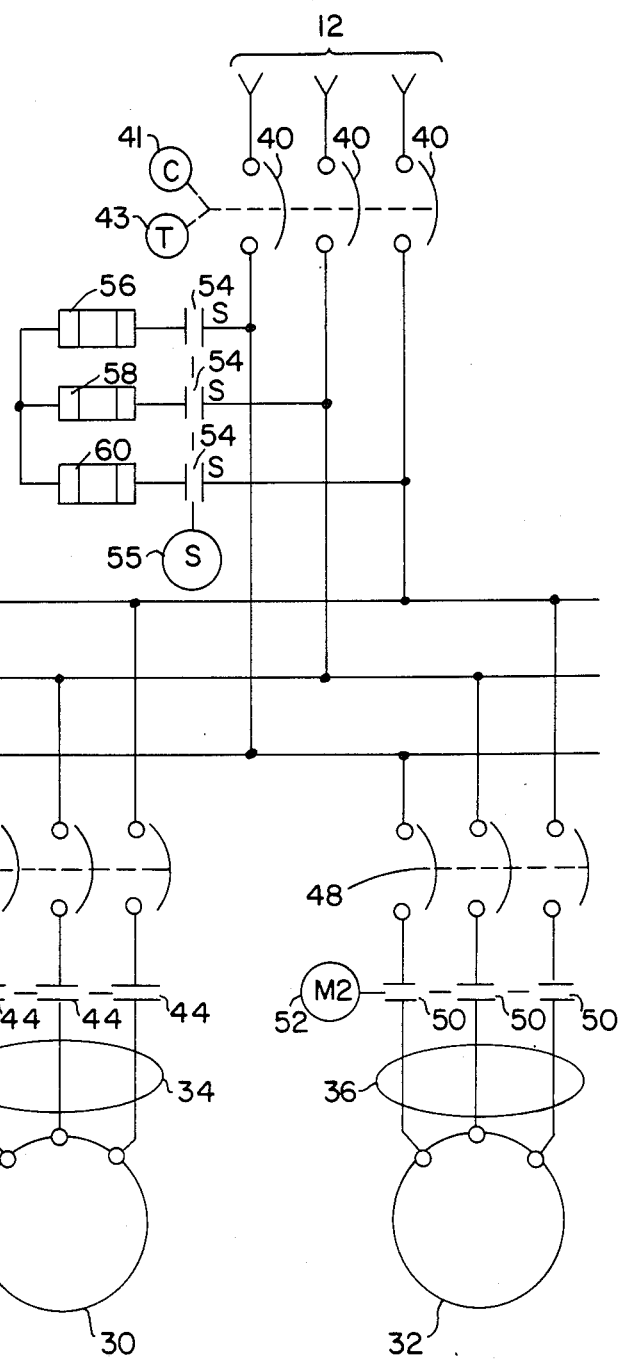
FIG. 2 is a schematic diagram of a power circuit like that of FIG. 1 but for supplying multiple electrical machines.

FIG. 2 shows two electrical machines 30 and 32 connected by electrical conductors 34 and 36 respectively to a common bus 38. A main source switching means 40, which is normally closed in operation, connects the bus 38 to the voltage source 12. The main source switching means 40 is a three pole electrically-operated circuit breaker which has three sets of contacts and which is controlled by a trip coil 43 and a closing coil 41. The electrical machine 30 is controlled by a three pole circuit breaker 42 and a three pole contactor 44 controlled by a contactor coil 46. The electrical machine 32 is controlled by a three pole circuit breaker 48 and a three pole contactor 50 controlled by a contactor coil 52. It is important to note that the circuit breakers 40, 42, and 48 are mechanically latched closed and that the contactors 44, 50 must either operate off of an independent control voltage or be of the type of switchgear which is mechanically latched closed or is capable of remaining closed without power for a short period of time, such as one-half second, to allow time for the transfer operation.

The bus 38 is connected to one side of a three pole short circuiting switch 54. The short circuiting switch 54 is controlled by a short circuiting coil 55. The other side of each contact of the short circuiting switch 54 is connected to one side of each of three fuses 56, 58, and 60, and the other side of the fuses 56, 58, and 60 are connected together to complete the short circuit.

One of the main applications of the fast transfer switch described herein is to switch from a main power supply to an alternate power supply. In the preferred embodiment of the invention illustrated in FIG. 4, a circuit is shown which accomplishes precisely this function. A main voltage source 100 is connected to a main bus 102 by a main source circuit breaker 104, which is operated by a main source circuit breaker trip coil 106 and closing coil 105. The main source circuit breaker 104 is normally closed to supply power from the main voltage source 100 to the main bus 102.

An auxiliary voltage source 108 is connected to a main bus 102 by an auxiliary source circuit breaker 110, which is operated by an auxiliary source circuit breaker trip coil 112 and closing coil 111. The auxiliary source circuit breaker 110 is normally open, not supplying power from the auxiliary voltage source 108 to the main bus 102. The main bus 102 is connected to one side of a three pole short circuiting switch 114. The short circuiting switch 114 is controlled by a short circuiting coil 116. The other side of each contact of the short circuiting switch 114 is connected to one side of each of three fuses 118, 120, and 122, and the other side of the fuses 56, 58, and 60 are connected together to complete the short circuit.

Powered by the main bus 102 are two electrical machines 124 and 126. The electrical machine 124 is controlled by a three pole circuit breaker 128 and a three pole contactor 130 controlled by a contactor coil 132. The electrical machine 126 is controlled by a three pole circuit breaker 134 and a three pole contactor 136 controlled by a contactor coil 138.

When the main voltage source 100 is interrupted, the main source circuit breaker 104 opens, and the short circuiting switch 114 closes. After a predetermined time, or after the motor residual voltage drops to a predetermined value, the short circuiting switch 114 opens and the auxiliary source circuit breaker 110 closes, connecting the main bus to the auxiliary voltage source 108.

Figure 3:
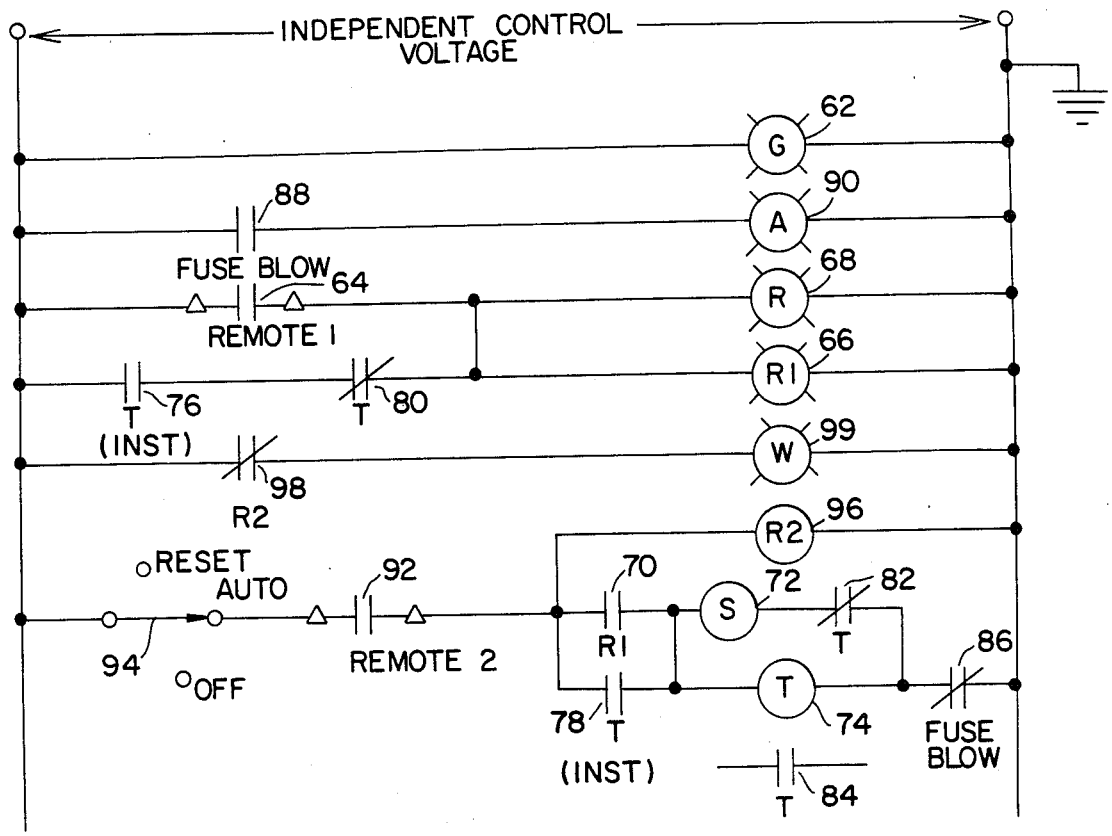
FIG. 3 is a schematic diagram of a control circuit for use with the systems of FIGS. 1, 2, and 4.
Figure 4:
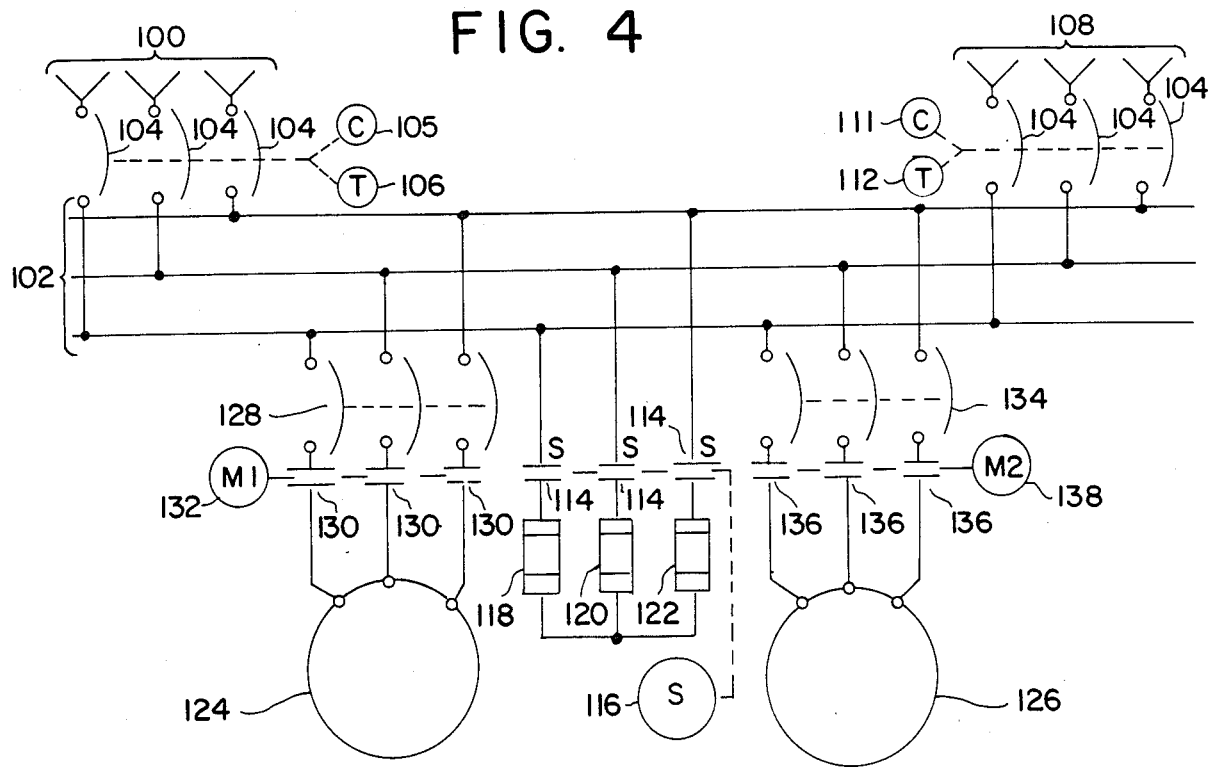
FIG. 4 is a schematic diagram of a power circuit for allowing connection to an alternate power supply following interruption in a primary power supply without damaging electrical machines connected to the bus line.

FIG. 3 illustrates a control circuit for controlling the systems of FIGS. 1, 2, or 4. The control circuit of FIG. 3 is powered by an independent control voltage, the presence of which is indicated by a green lamp 62 across the independent control voltage. A first remote contact 64 which is normally open closes when a momentary disruption in the line is sensed. The first remote contact 64 is triggered by the opening of the source switching means 16 (FIG. 1), the main source switching means 40 (FIG. 2), or by a protective relay (not shown) or the opening of a remote upstream circuit breaker (not shown). When the first remote contact 64 closes, it energizes a relay coil 66, and lights a red lamp 68 to indicate a switching operation is taking place.

A normally open contact 70 of the relay coil 66 closes, and energizes a main coil 72 and a timing coil 74. The main coil 72 is the short circuit switch coil (22 in FIG. 1, 56 in FIG. 2, and 116 in FIG. 4). A normally open contact 76 of the timing coil 74 instantly closes and bypasses the first remote contact 64, and a normally open contact 78 instantly closes and bypasses the contact 70.

After the timing coil 74 times out, a normally closed contact 80 in series with the contact 76 opens, interrupting power to the relay coil 66 and the red lamp 68. When the timing coil 74 times out it also causes normally closed contact 82 to open, deenergizing the main coil 72 and opening the short circuiting switch (20 in FIG. 1, 54 in FIG. 2, and 114 in FIG. 4). Finally, when the timing coil 74 times out it also causes normally open contact 84 to close, which again enables the source switching means 16 (FIG. 1), the main source switching means 40 (FIG. 2), or the auxiliary source switching means 110 (FIG. 4) to close.

If one of the fuses (24, 26, and 28 in FIG. 1, 56, 58, and 60 in FIG. 2, and 118, 120, and 122 in FIG. 4) blows, a normally closed contact 86 opens, deenergizing both the short circuiting switch main coil 72 and the timing coil 74. In addition, if and when a fuse blows a normally open contact 88 closes, lighting an amber lamp 90. A second remote contact 92 is provided which is normally closed, and which, if opened, similarly deenergizes both the short circuiting switch main coil 72 and the timing coil 74. The second remote contact 92 may be, for example, a contact of an overcurrent relay which operates to indicate a short circuit on the electrical machine or in the power supply circuitry.

It will be appreciated by those skilled in the art that the second remote contact 92 may also represent several contacts in series, any one of which, when open, will block the transfer operation. When the second remote contact 92 is open, a relay coil 96 is deenergized and its normally closed contact 98 returns to a closed position to light a white lamp 99.

Finally, also in the circuit of FIG. 3 in a position to deenergize both the main coil 72 and the timing coil 74, is a selector switch 94. It is normally in the "auto" position, which is closed to provide power to the main coil 72 and the timing coil 74. The switch 94 may be turned to the "off" position for maintenance and repair. The "reset" position may be used to reset the circuit following, for example, a blown fuse condition, and the switch would return from the "reset" position to the "auto" position by spring action.

The control system of FIG. 3 is typical of one in which the close time of the short circuiting switch is controlled by a time delay relay. Such a system can be readily modified in a manner whereby the short circuiting switch is controlled and caused to open when the residual voltage magnitude decays to a safe value, as those skilled in the art will recognize. Solid state controls could also be used instead of the electromechanical relays illustrated in FIG. 3.

Figure 5:
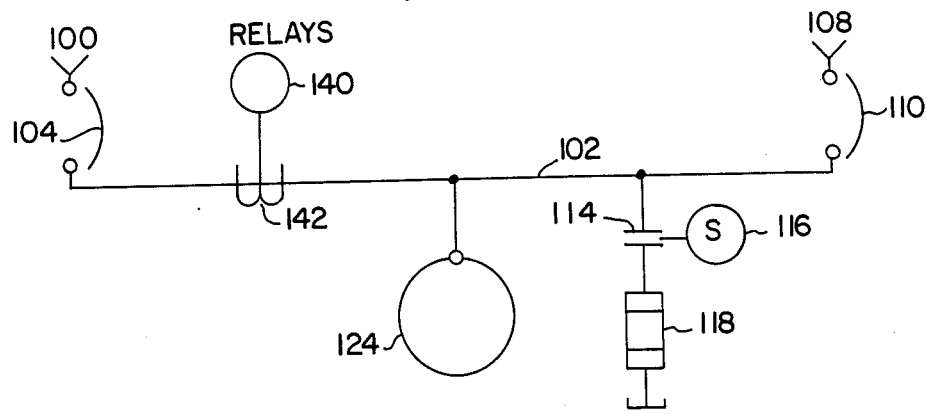
FIG. 5 is a one line schematic diagram of a power circuit similar to the circuit shown in FIG. 4, but also including overcurrent relays to block fast transfer in the event of a short circuit.

FIG. 5 shows one line of a system like that of FIG. 4, except for the addition of overcurrent relays 140 driven by current transformers 142. The breakers 128 and 134, the contactors 130 and 136, the electrical machine 126, and the other two lines are omitted from FIG. 5 for clarity. The overcurrent relay 140 is used to block a fast transfer in the event of a short circuit on the main bus 102 or feeder circuits (not shown) connected to the main bus 102. The overcurrent relay 140 would act as the second remote contact 92 shown in FIG. 3 to shut down the system, thereby preventing the connection of the auxiliary voltage source 108 to the main bus 102.

Figure 6:
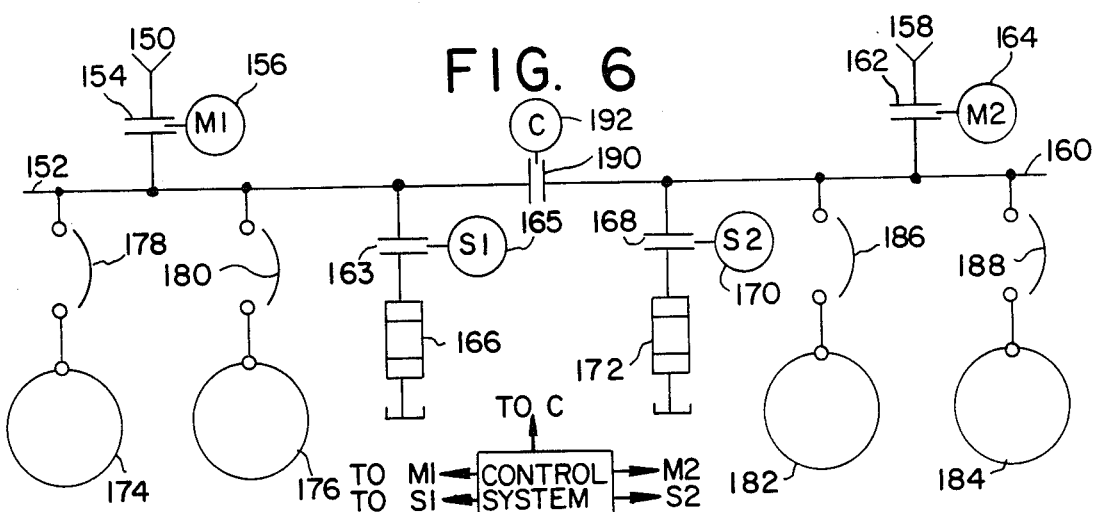
FIG. 6 is a one line schematic diagram of a power circuit with two busses normally driven from different power supplies adapted to be connected in the event of an interruption of one of the power supplies.

FIG. 6 is a one line schematic of a circuit with two independent busses supplied from two independent voltage sources, each bus having a short circuiting switch installed thereto. A first voltage source 150 is supplied to a first bus 152 through a first source switching means 154 operated by a main source circuit breaker trip coil 156. A second voltage source 158 is supplied to a second bus 160 through a second source switching means 162 operated by a main source circuit breaker trip coil 164.

The first bus 152 is connected to one side of a first short circuiting switch 163. The first short circuiting switch 163 is controlled by a first short circuiting coil 165. The other side of the first short circuiting switch 163 is connected to one side of a first fuse 166, and the other side of the first fuse 166 is connected to complete the short circuit of the first bus 152.

The second bus 160 is connected to one side of a second short circuiting switch 168. The second short circuiting switch 168 is controlled by a second short circuiting coil 170. The other side of the second short circuiting switch 168 is connected to one side of a second fuse 172, and the other side of the second fuse 172 is connected to complete the short circuit of the second bus 160.

The first bus 152 is connected to two electrical machines 174, 176 through two circuit breakers 178, 180, respectively. The second bus 160 is connected to two electrical machines 182, 184 through two circuit breakers 186, 188, respectively. Finally, a normally open circuit breaker 190 operated by a circuit breaker trip coil 192 is used to selectively connect the first and second busses 152, 160 together. The main source circuit breaker trip coil 156 and the main source circuit breaker trip coil 164 may be tripped and the first and second short circuiting switches 163, 168 and the circuit breaker 190 may be operated by a control system 193, shown schematically in FIG. 6.

Under normal conditions, the first and second source switching means 154, 162 are closed, and the first and second short circuiting switches 163, 168 and the circuit breaker 190 are open. If there is an interruption in the first voltage source 150, the first source switching means 154 will open, and the first short circuiting switch 163 will close. After a predetermined period of time, or after the residual voltage of motors on the first bus 152 has diminished to a predetermined value, the first short circuiting switch 163 will open and the circuit breaker 190 will close, connecting the first and second busses 152, 160 together to be supplied by the second voltage source 158.

Similarly, if there is an interruption in the second voltage source 158, the second source switching means 162 will open, and the second short circuiting switch 168 will close. After a predetermined period of time, or after the residual voltage of motors on the second bus 160 has diminished to a predetermined value, the second short circuiting switch 168 will open and the circuit breaker 190 will close, connecting the first and second busses 152, 160 together to be supplied by the first voltage source 150.

Figure 7:
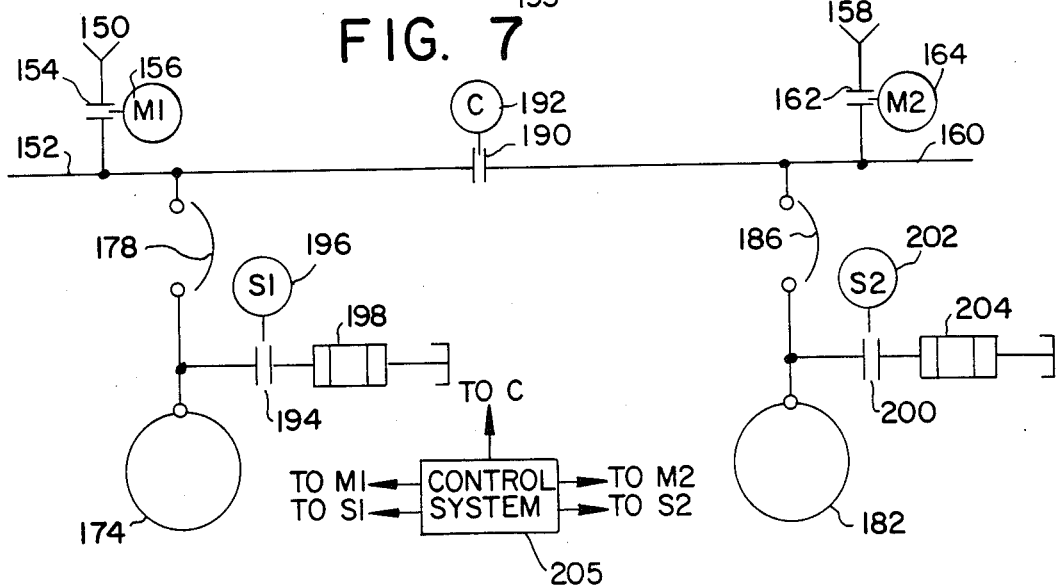
FIG. 7 is a one line schematic diagram of a power circuit like that shown in FIG. 4 but with individual machines being individually short circuited when a transfer is to occur.

An alternate placement for the short circuit is next to an individual electrical machine. This configuration is useful particularly when one of the electrical machines on a bus has a time constant which is much larger than other machines on the bus, and is illustrated in FIG. 7. FIG. 7 is similar to FIG. 6, but has the electrical machines 176 and 184, and their associated circuit breakers 180 and 188, respectively, removed for clarity. Also removed are the short circuit switches 162, 168, their coils 164, 170, and the fuses 166, 172.

In FIG. 7, the side of the circuit breaker 178 which is connected to the electrical machine 174 is also connected to one side of a first short circuiting switch 194. The first short circuiting switch 194 is controlled by a first short circuiting switch coil 196. The other side of the first short circuiting switch 196 is connected to one side of a first fuse 198, and the other side of the first fuse 198 is connected to complete the short circuit of the first bus 152.

The side of the circuit breaker 186 which is connected to the electrical machine 182 is also connected to one side of a second short circuiting switch 200. The second short circuiting switch 200 is controlled by a second short circuiting switch coil 202. The other side of the second short circuiting switch 200 is connected to one side of a second fuse 204, and the other side of the second fuse 204 is connected to complete the short circuit of the second bus 160. The main source circuit breaker trip coil 156 and the main source circuit breaker trip coil 164 may be tripped and the circuit breaker 190 and the first and second short circuiting switches 194, 200 may be operated by a control system 205, shown schematically in FIG. 7.

The operation of the circuit shown in FIG. 7 is identical to the operation of the circuit shown in FIG. 6. It will be understood that a number of electrical machines each having a short circuiting switch and a fuse could be installed on each bus, with the circuit breaker associated with the particular machine being opened to remove the machine from the bus. In this way, a number of machines could be brought back on line on the bus as soon as their individual time constants allowed, while the bus was connected to the other bus at the earliest time allowed by the time constants of any of the machines on the bus.

Figure 8:
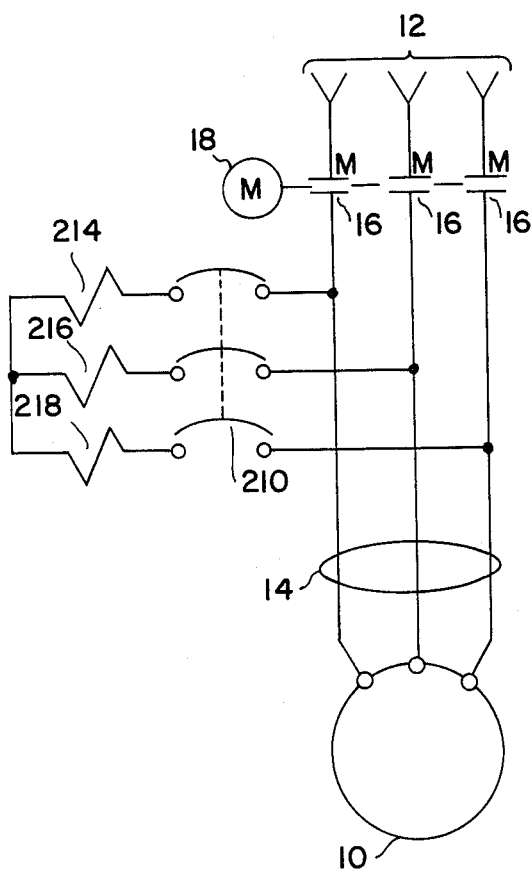
FIG. 8 is a schematic diagram of a power circuit like that of FIG. 1, but using a low voltage circuit breaker and a direct-acting trip device rather than a contactor and a fuse.
Figure 9:
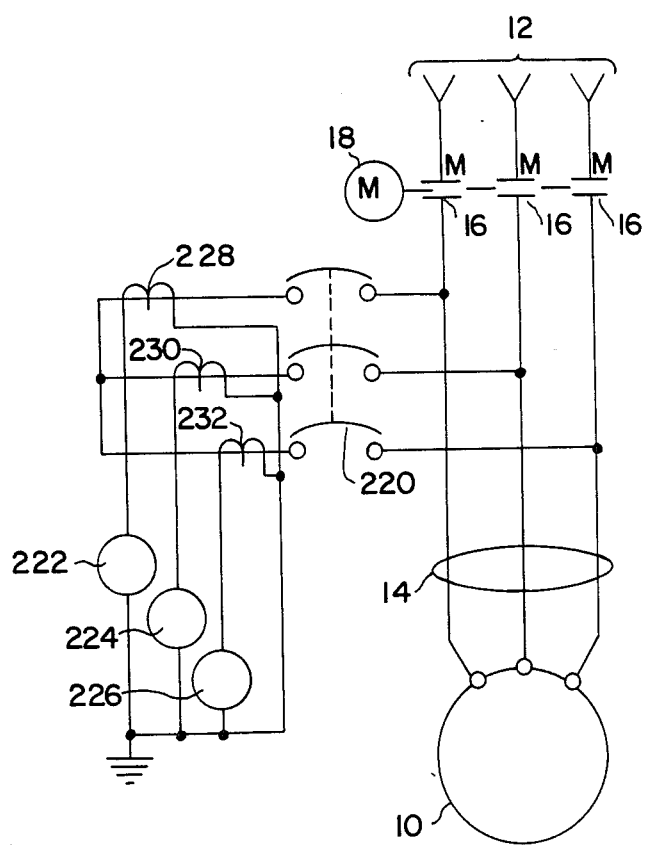
FIG. 9 is a schematic diagram of a power circuit like that of FIG. 1, but using a low or medium voltage circuit breaker and instantaneous overcurrent relays rather than a contactor and a fuse.

It will also be recognized by those skilled in the art that other switchgear can be utilized in place of the contactors and fuses. For example, in FIG. 8 a low voltage three pole circuit breaker 210 is used in conjunction with direct acting trip devices 214, 216, and 218. In FIG. 9, a low or medium voltage circuit breaker 220 is used in conjunction with instantaneous overcurrent tripping relays 222, 224, and 226, which are driven by current transformers 228, 230, and 232, respectively. It will of course appreciated by those skilled in the art that fuses may be used in series with low or medium voltage circuit breakers used as shorting switches, either with or without other trip devices such as those shown in FIGS. 8 and 9.

It is thus apparent that the present invention affords many advantages over the art in that it allows fast transfers from one power source to another or fast reconnections to a momentarily interrupted power source without subjecting the machines to unsafe voltages levels. It not only allows successful transfers of low inertia systems and rapid reclosure of utility lines not allowed by previous switching systems, but it does not require that that the machine by in synchronism with the line, or even that the phase angle be nearly the same.

Synchronous machines may be fast transferred with the present invention after first interrupting their fields. Fast transfers following upstream disturbances are also possible, even though such disturbances may produce uncertainties in transfer time of motor deceleration. Thus, the system of the present invention is faster and cheaper than past systems, and is a highly desirable switching system for use with electrical machines.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A system for protection of one or more electrical machines, comprising:
   a voltage source switching means for connection to a voltage source;

conductors extending between said voltage source switching means and the terminals of said one or more electrical machines;

a short circuiting switch for connection to said conductors in such a manner that said conductors are short circuited when said short circuiting switch is closed;

control means for opening said voltage source switching means and closing said short circuiting switch after said voltage source is interrupted, said short circuiting switch being held closed for a predetermined period of time and, at the end of said predetermined period of time, said short circuiting switch being opened and said voltage source switching means being closed, thereby enabling said voltage source to be re-established; and means for preventing said short circuiting switch from maintaining a short circuit if completing a short circuit inadvertently results in a short of said voltage source.

2. A system as defined in claim 1, wherein said short circuiting switch is a contactor.

3. A system as defined in claim 2, wherein said short circuiting switch provides a short circuit leg between each different pair of said conductors, said preventing means comprising:

a of fuse inserted in each short circuit leg between said conductors.

4. A system as defined in claim 3, wherein one side of each short circuit leg of said contactor is connected to one of said conductors, the other side of each short circuit leg of said contactor is connected to one side of one of said fuses, and the other side of said fuses are connected together to complete the short circuit.

5. A system as defined in claim 1, wherein said short circuiting switch is a low voltage or medium voltage circuit breaker.

6. A system as defined in claim 1, wherein said preventing means comprises:

a direct acting trip device for tripping said short circuiting switch.

7. A system as defined in claim 1, wherein the action to open said voltage source switching means and the action to close said short circuiting switch are undertaken essentially simultaneously, and the action to open said short circuiting switch and the action to close said voltage source switching means are undertaken essentially simultaneously.

8. A system as defined in claim 1, wherein the voltage source switching means and the short circuiting switch operate from an independent control voltage.

9. A system as defined in claim 1, wherein the voltage source switching means and the short circuiting switch are capable of remaining closed without power for a short period of time, such as one-half second, to allow time for the transfer operation.

10. A system as defined in claim 1, wherein said preventing means comprises:

an instantaneous overcurrent relay for tripping each leg of said short circuiting switch; and a current transformer on each leg of the short circuit between between said electrical machine supply conductors.

11. A system as defined in claim 1, additionally comprising:

switch means inserted in the line between said short circuiting switch and said electrical machine, wherein said switch means is selected from the group consisting of a contactor and a circuit breaker.

12. A system as defined in claim 1, additionally comprising:

switch means inserted in the line between said short circuiting switch and said voltage source switching means, wherein said switch means is selected from the group consisting of a contactor and a circuit breaker.

13. A system for protection of one or more electrical machines, comprising:

a voltage source switching means for connection to a voltage source;

conductors extending between said voltage source switching means and the terminals of said one or more electrical machines;

a short circuiting switch for connection to said conductors in such a manner that said conductors are short circuited when said short circuiting switch is closed;

control means for opening said voltage source switching means and closing said short circuiting switch after said voltage source is interrupted, said short circuiting switch being held closed until the residual voltage of said electrical machines has decayed to a predetermined value, after which said short circuiting switch is opened and said voltage source switching means is closed, thereby enabling said voltage source to be reestablished; and means for preventing said short circuiting switch from maintaining a short circuit if completing a short circuit inadvertently results in a short of said voltage source.

14. A system as defined in claim 13, wherein said short circuiting switch is a contactor.

15. A system as defined in claim 14, wherein said short circuiting switch provides a short circuit leg between each different pair of said conductors, said preventing means comprising:

a fuse in each short circuit leg between said conductors.

16. A system as defined in claim 15, wherein one side of each short circuit leg of said contactor is connected to one of said conductors, the other side of each short circuit leg of said contactor is connected to one side of one of said fuses, and the other side of said fuses are connected together to complete the short circuit.

17. A system as defined in claim 13, wherein said short circuiting switch is a low voltage or medium voltage circuit breaker.

18. A system as defined in claim 13, wherein said preventing means comprises:

a direct acting trip device for tripping said short circuiting switch.

19. A system as defined in claim 13, wherein the action to open said voltage source switching means and the action to close said short circuiting switch are undertaken essentially simultaneously, and the action to open said short circuiting switch and the action to close said voltage source switching means are undertaken essentially simultaneously.

20. A system as defined in claim 13, wherein the voltage source switching means and the short circuiting switch operate off of an independent control voltage.

21. A system as defined in claim 13, wherein the voltage source switching means and the short circuiting switch are capable of remaining closed without power for a short period of time, such as one-half second, to allow time for the transfer operation.

22. A system as defined in claim 13, wherein said preventing means comprises:
   an instantaneous overcurrent relay for tripping each leg of said short circuiting switch; and
   a current transformer on each leg of the short circuit between said electrical machine supply conductors.

23. A system as defined in claim 13, additionally comprising:
   switch means inserted in the line between said short circuiting switch and said electrical machine, wherein said switch means is selected from the group consisting of a contactor and a circuit breaker.

24. A system as defined in claim 13, additionally comprising:
   switch means inserted in the line between said short circuiting switch and said voltage source switching means, wherein said switch means is selected from the group consisting of a contactor and a circuit breaker.

25. A system for protection of electrical machines wherein said machines are supplied from a first voltage source or a second voltage source, said system comprising:
   a first voltage source switching means for connection to said first voltage source, said first voltage source switching means being normally operated closed;
   a second voltage source switching means for connection to said second voltage source, said second voltage source switching means being normally operated open;
   a short circuiting switch for connection to electrical machine supply conductors which connect said first and second voltage source switching means and the terminals of said electrical machines, in such a manner that said supply conductors are short circuited when said short circuiting switch is closed;
   control means for opening said first voltage source switching means and closing said short circuiting switch after said first voltage source is interrupted, said short circuiting switch being held closed for a predetermined period of time and, at the end of said predetermined period of time, said short circuiting switch being opened and said second voltage source switching means being closed, thereby enabling said second voltage source to be established; and
   means for preventing said short circuiting switch from maintaining a short circuit if completing a short circuit inadvertently results in a short of either of said first and second voltage sources.

26. A system as defined in claim 25, additionally comprising:
   means for inhibiting said control means from closing said short circuiting switch or said second voltage source switching means if there is a short circuit on said supply connectors.

27. A system as defined in claim 26, wherein said inhibiting means includes current transformers for sensing overcurrent in said supply conductors and an overcurrent relay for preventing said control means from closing.

28. A system for protection of electrical machines wherein said machines are supplied from a first voltage source or a second voltage source, said system comprising:
   a first voltage source switching means for connection to said first voltage source, said first voltage source switching means being normally operated closed;
   a second voltage source switching means for connection to said second voltage source, said second voltage source switching means being normally operated open;
   a short circuiting switch for connection to electrical motor supply conductors which connect said first and second voltage source switching means and the terminals of said electrical machines, in such a manner that said supply conductors are short circuited when said short circuiting switch is closed;
   control means for opening said first voltage source switching means and closing said short circuiting switch after said first voltage source is interrupted, said short circuiting switch being held closed until the residual voltage of said electrical machines has decayed to a predetermined value, after which said short circuiting switch is opened and said second voltage source switching means is closed, thereby enabling said second voltage source to be established; and
   means for preventing said short circuiting switch from maintaining a short circuit if completing a short circuit inadvertently results in a short of either of said first and second voltage sources.

29. A system as defined in claim 28, additionally comprising:
   means for inhibiting said control means from closing said short circuiting switch or said second voltage source switching means if there is a short circuit on said supply conductors.

30. A system as defined in claim 29, wherein said inhibiting means includes current transformers for sensing overcurrent in said supply conductors and an overcurrent relay for preventing said control means from closing.

31. A system for protection of a first group of electrical machines on a first bus supplied from a first voltage source and a second group of electrical machines on a second bus supplied from a second voltage source, said system comprising:
   a first voltage source switching means for connecting said first voltage source to said first bus, said first voltage source switching means being normally operated closed;
   a second voltage source switching means for connecting said second voltage source to said second bus, said second voltage source switching means being normally operated closed;
   a bus connecting switch for connecting said first and second busses, said bus connecting switch being normally operated open;
   first electrical machine supply conductors extending between said first bus and said first group of electrical machines;
   a first short circuiting switch for connection to said first electrical machine supply conductors in such a manner that said first supply conductors are short circuited when said first short circuiting switch is closed;
   second electrical machine supply conductors extending between said second bus and said second group of electrical machines;

a second short circuiting switch for connection to said second electrical machine supply conductors in such a manner that said second supply conductors are short circuited when said second short circuiting switch is closed;
control means for either;
  a. opening said first voltage source switching means and closing said first short circuiting switch after said first voltage source is interrupted, said first short circuiting switch being held closed for a predetermined period of time and, at the end of said predetermined period of time, said first short circuiting switch being opened and said bus connecting switching means being closed, thereby enabling said second voltage source to be established on said first bus as well as on said second bus; or
  b. opening said second voltage source switching means and closing said second short circuiting switch after said second voltage source is interrupted, said second short circuiting switch being held closed for a predetermined period of time and, at the end of said predetermined period of time, said second short circuiting switch being opened and said bus connecting switching means being closed, thereby enabling said first voltage source to be established on said second bus as well as on said first bus;
means for preventing either of said first and second short circuiting switches from maintaining a short circuit if completing a short circuit inadvertently results in a short of either of said first and second voltage sources.

32. A system for protection of a first group of electrical machines on a first bus supplied from a first voltage source and a second group of electrical machines on a second bus supplied from a second voltage source, said system comprising:
  a first voltage source switching means for connecting said first voltage source to said first bus, said first voltage source switching means being normally operated closed;
  a second voltage source switching means for connecting said second voltage source to said second bus, said second voltage source switching means being normally operated closed;
  a bus connecting switch for connecting said first and second busses, said bus connecting switch being normally operated open;
  first electrical machine supply conductors extending between said first bus and said first group of electrical machines;
  a first short circuiting switch for connection to said first electrical machine supply conductors in such a manner that said first supply conductors are short circuited when said first short circuiting switch is closed;
  second electrical machine supply conductors extending between said second bus and said second group of electrical machines;
  a second short circuiting switch for connection to said second electrical machine supply conductors in such a manner that said second supply conductors are short circuited when said second short circuiting switch is closed;
  control means for either;
    a. opening said first voltage source switching means and closing said first short circuiting switch after said first voltage source is interrupted, said first short circuiting switch being held closed until the residual voltage of said first group of electrical machines has decayed to a predetermined value, after which said first short circuiting switch is opened and said bus connecting switching means is closed, thereby enabling said second voltage source to be established on said first bus as well as on said second bus; or
    b. opening said second voltage source switching means and closing said second short circuiting switch after said second voltage source is interrupted, said second short circuiting switch being held closed until the residual voltage of said second group of electrical machines has decayed to a predetermined value, after which said second short circuiting switch is opened and said bus connecting switching means is closed, thereby enabling said first voltage source to be established on said second bus as well as on said first bus;
  means for preventing either of said first and second short circuiting switches from maintaining a short circuit if completing a short circuit inadvertently results in a short of either of said first and second voltage sources.

* * * * *